United States Patent [19]
Howell et al.

[11] Patent Number: 5,754,397
[45] Date of Patent: May 19, 1998

[54] DOCKING CONNECTOR WITH HEIGHT ADJUSTMENT IN A COMPUTER SYSTEM

[75] Inventors: Bryan Howell, Austin, Tex.; Peter N. Skillman, San Carlos, Calif.; Bryan K. Hunter, Austin, Tex.

[73] Assignee: Dell Computer Corporation, Austin, Tex.

[21] Appl. No.: 786,532

[22] Filed: Jan. 21, 1997

[51] Int. Cl.$^6$ .................... G06F 1/16; H05K 5/03
[52] U.S. Cl. .................... 361/686; 361/683; 439/142
[58] Field of Search ............... 361/680–686; 439/136, 142, 143, 145, 928.1; 312/223.1, 223.2, 327, 328; 364/708.1; G06F 1/16

[56] References Cited

U.S. PATENT DOCUMENTS

| | | | |
|---|---|---|---|
| 4,742,478 | 5/1988 | Nigro, Jr. et al. | 312/223.2 |
| 4,958,889 | 9/1990 | Boyle et al. | 361/683 |
| 5,182,698 | 1/1993 | Kobayashi et al. | 361/686 |
| 5,187,645 | 2/1993 | Spalding et al. | |
| 5,199,888 | 4/1993 | Condra et al. | |
| 5,219,294 | 6/1993 | Marsh et al. | |
| 5,265,238 | 11/1993 | Canova, Jr. et al. | |
| 5,283,714 | 2/1994 | Tsai et al. | |
| 5,379,183 | 1/1995 | Okonsky et al. | 361/681 |
| 5,408,382 | 4/1995 | Schultz et al. | |
| 5,411,416 | 5/1995 | Balon et al. | |
| 5,450,271 | 9/1995 | Fukushima et al. | 361/686 |
| 5,488,572 | 1/1996 | Belmont | |
| 5,555,157 | 9/1996 | Moller et al. | 361/683 |
| 5,594,617 | 1/1997 | Foster et al. | 361/679 |

*Primary Examiner*—Lynn D. Feild
*Attorney, Agent, or Firm*—Haynes and Boone, L.L.P.

[57] ABSTRACT

A computer system includes a housing having a docking connector. A combined height adjustment and cover member is mounted on the housing and is movable from a first position wherein the connector is covered, to a second position wherein the connector is uncovered and the member is in abutment with an external surface of the housing and positioned to be engagable with a docking tray for elevating the housing above the tray surface. This provides a variable height adjustment capability between the docking connector of the computer and the mating connector on the docking tray.

12 Claims, 4 Drawing Sheets

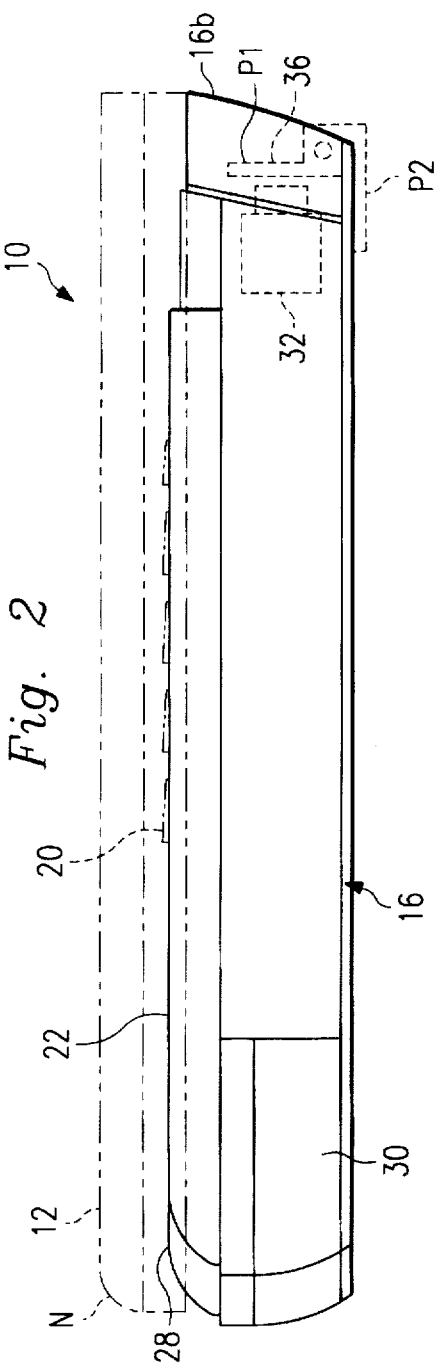
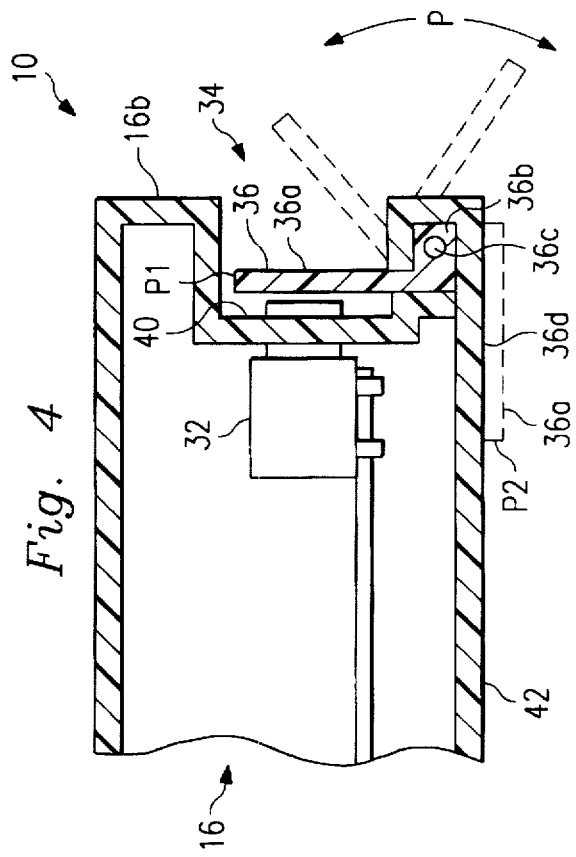
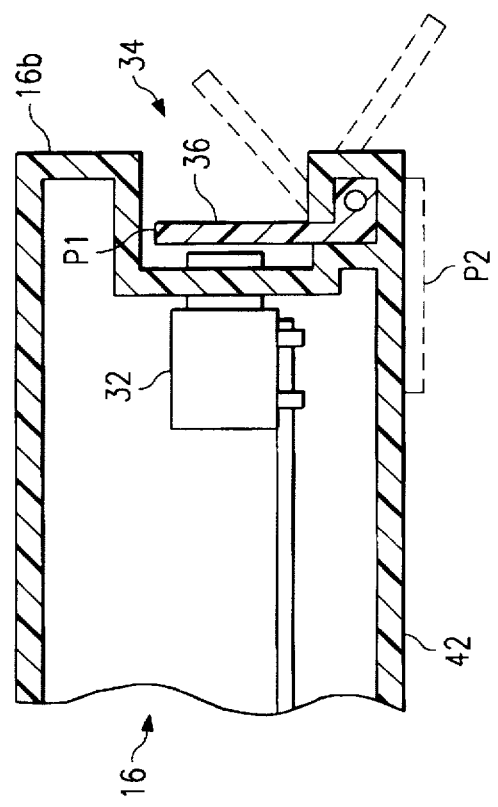

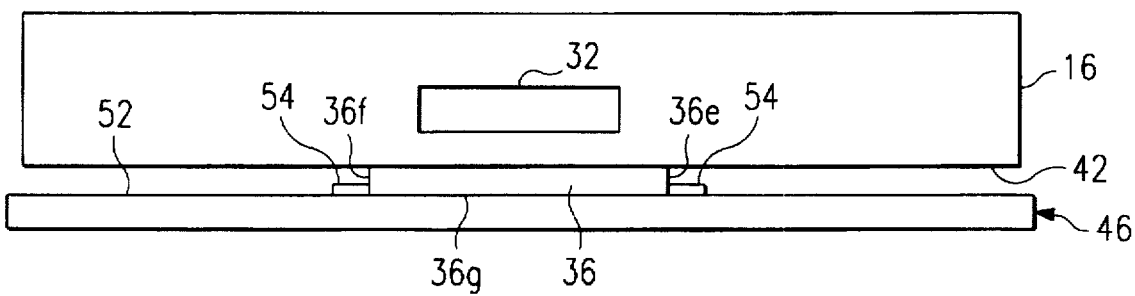
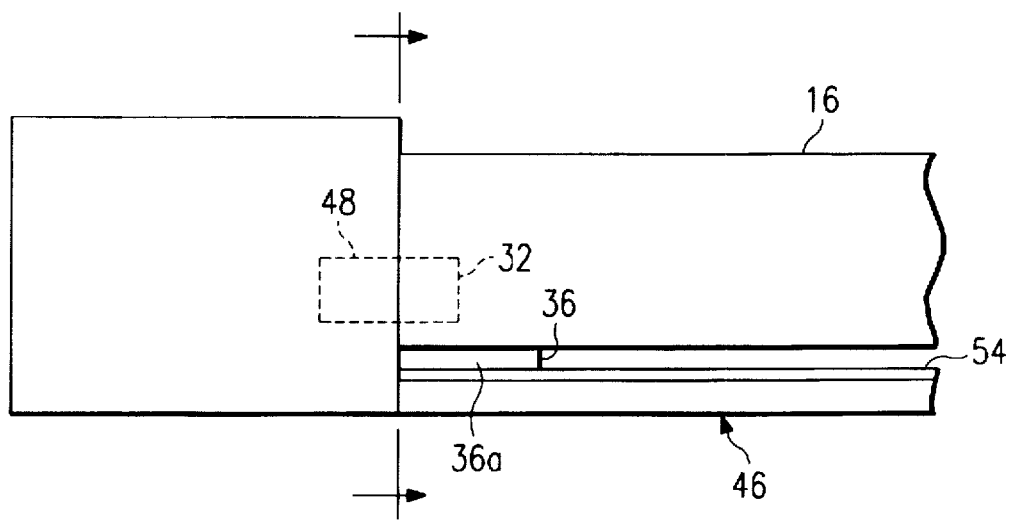

DOCKING CONNECTOR WITH HEIGHT ADJUSTMENT IN A COMPUTER SYSTEM

BACKGROUND

The disclosures herein relate generally to a docking connector in a portable computer system and more particularly to providing a variable height adjustment capability between the docking connector of the computer the mating connector on a docking tray.

In notebook computers it has become necessary to have various sizes of notebooks be attachable to the same docking system which includes a mating connector on a docking tray. This allows backwards and forwards compatibility of notebooks and their associated docking trays. This has become an important marketing requirement since it saves the customer money and trouble because they are not required to purchase and install a new docking system with every new technology update of a computer line. The problem occurs when the docking connector on the notebook is required to be in exactly the same position on all sizes of computers. Biasing the connector on the notebook left and right is not a problem but accommodating the up and down, or Z height, of the connector is very difficult as the heights of the notebooks vary. Docking trays have been used to align the docking height, but the trays are a separate item and not self-contained as a part of the notebook computer. Unfortunately, a suitable solution to the problems associated with accommodating the various heights of docking connectors as a self-contained part of a notebook computer, has not been satisfactorily addressed by the prior art.

Therefore, what is needed is an apparatus and a method for facilitating the accommodation of the various heights of docking connectors. It is also highly desirable to provide a self-contained height adjustment and also guides for maintaining proper lateral alignment of the docking connector.

SUMMARY

One embodiment, accordingly, provides an apparatus and method for providing a variable height adjustment capability between the docking connector of a computer and the mating connector of an associated docking tray. To this end, a computer housing is provided with a docking connector. A door is mounted on the housing for movement between a first position covering the connector and a second position uncovering the connector and positioned to be engagable with a computer support surface for elevating the housing above the surface.

A principal advantage is that the door is pivoted to the underside of the computer housing which places the door between the housing and the support surface. This elevates the housing relative to the support surface to an adjusted height for docking the connector.

BRIEF DESCRIPTION OF THE DRAWINGS

FIG. 2 is a side view of the portable notebook computer of FIG. 1.

FIG. 3 is a partial cross-sectional side view illustrating an embodiment of a portable notebook computer.

FIG. 4 is an enlarged partial cross-sectional side view further illustrating the embodiment of FIG. 3.

FIG. 7 is a view taken along line 7—7 of FIG. 8.

FIG. 8 is a partial side view diagrammatically illustrating an embodiment of a docking tray and a portable notebook computer.

DESCRIPTION OF THE PREFERRED EMBODIMENT

Figure 1:
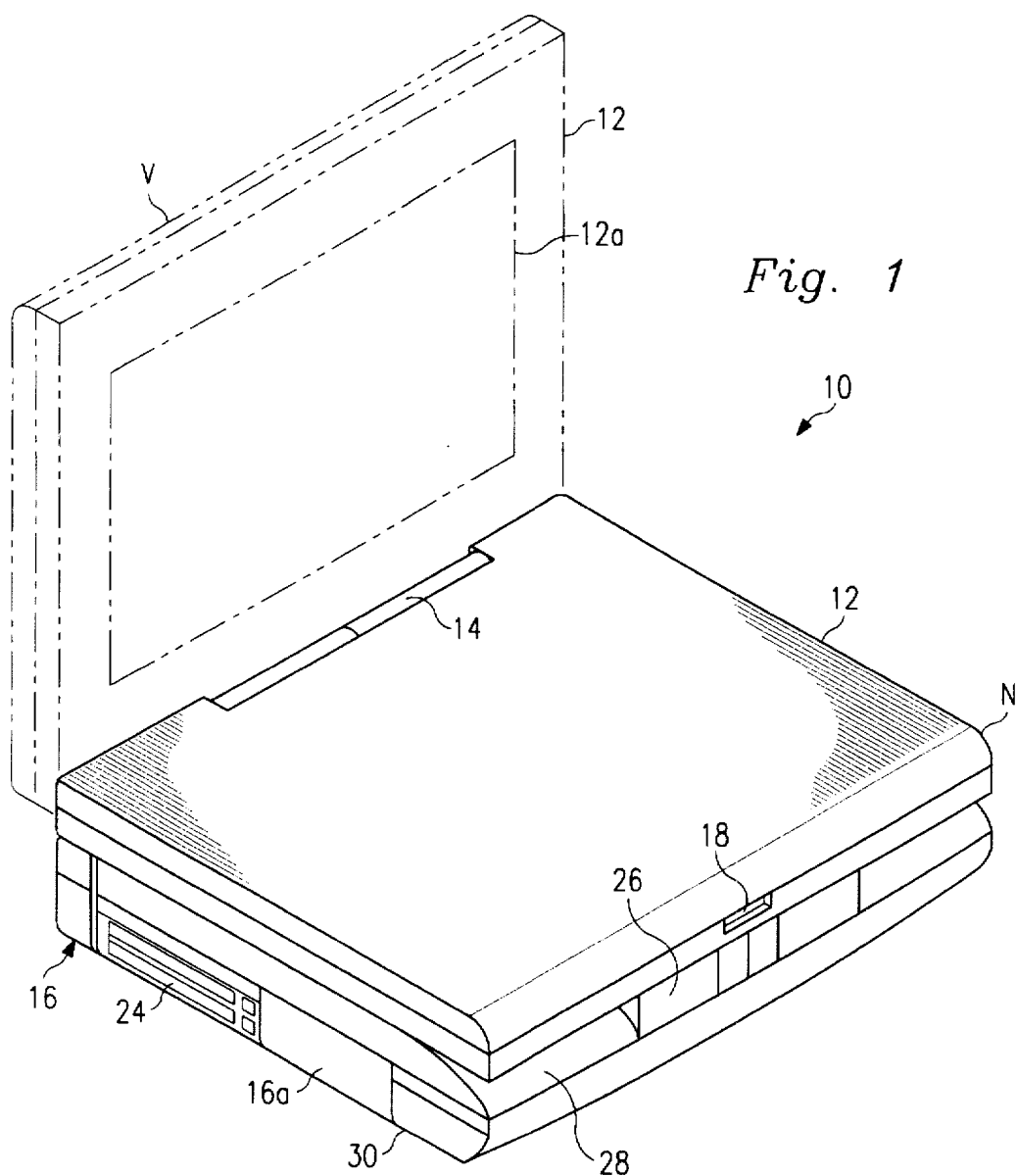
FIG. 1 is an isometric view illustrating an embodiment of a portable notebook computer.
Figure 1A:
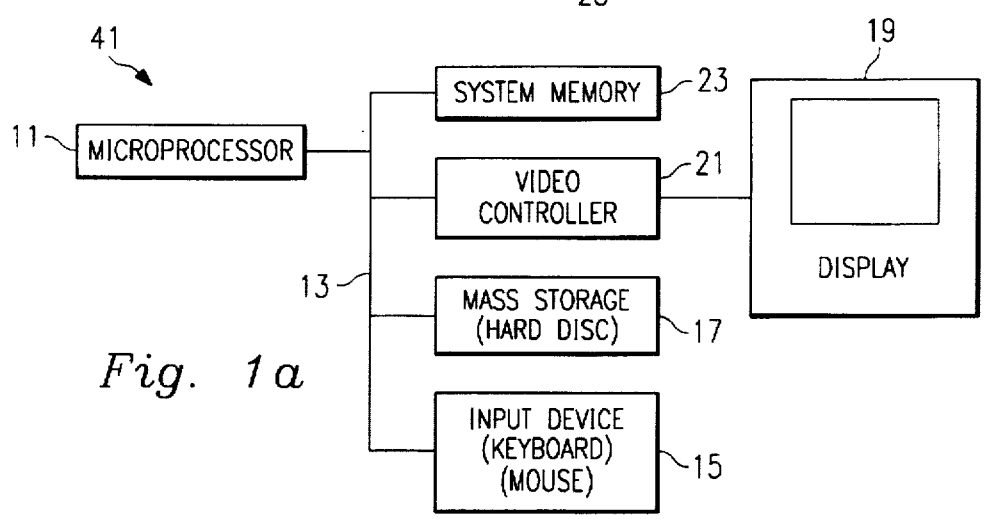
FIG. 1a is a diagrammatic view illustrating an embodiment of a typical computer system.

Referring to FIGS. 1 and 2, illustrated is a portable, notebook size computer designated 10 including a self-contained computer system 41, FIG. 1a, and including a hinged top or lid 12 rotatable about a pivotable member 14 from a nested position "N", with a horizontal base 16, to a substantially vertical or open position "V" shown in FIG. 1.

In one embodiment, computer system 41, FIG. 1a, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Opening of the notebook style portable computer by manipulation of a latch 18, reveals a plurality of keys 20, FIG. 2, on an exposed horizontal keyboard surface 22 of base 16, and a monitor screen 12a in an exposed portion of lid 12, FIG. 1. Computer 10 also includes a sidewall 16a having a plurality of external ports, an exemplary one of which is designated 24. Base 16 may also include a pointing device 26 such as a track pad, track ball or the like. A palm rest 28 is commonly provided adjacent keyboard 22, FIG. 2, which forms an upper surface of a battery housing 30.

Base 16 includes a rear wall 16b having a female docking connector 32, FIG. 2. Connector 32 is provided to be adjacent an opening 34 in wall 16b, FIG. 3, so as to be accessible for external connection to a mating connector on a docking tray (discussed below) for the purpose of connecting to a power source, a network, or for recharging notebook computer 10. A door 36 is mounted on wall 16b adjacent opening 34 and is movable between a first position P1 covering connector 32, and a second position P2 wherein connector 32 is uncovered.

Door 36 is connected to wall 16b by means of a hinged pivotal connection which permits door 36 to pivot through a 270° arc between positions P1 and P2 in the directions indicated by the directional arrow designated P in FIG. 4. A recess 40 is provided in wall 16b adjacent opening 34 so that when door 36 is pivoted to the first position P1, the door 36 not only covers connector 32, but is recessed within the recess portion 40 which is inset from rear wall 16b. Door 36 includes a planar portion 36a integrally formed with a hinged connector portion 36b which receives a hinge pin 36c for making the pivotal connection between door 36 and a hinge pin receiver portion 36d on wall 16b. The integral portions 36a, 36b of door 36 form a generally dog leg or "L" shaped cross-section.

When door 36 is pivoted to position P2, planar portion 36a rotates through the 270° arc to a position where planar portion 36a is in abutting engagement with a bottom or rest surface 42 of base 16. Ordinarily, rest surface 42 of base 16 engages a support surface (discussed below) upon which the computer 10 is seated. However, when door 36 is pivoted to position P2 so that planar portion 36a abuts surface 42 of base 16, it is the planar portion 36a which is engagable with the support surface having the effect of raising or elevating base 16 above the support surface by a distance $d_1$, FIG. 5, which is equal to the thickness $t_1$ of door 36. Thus, the pivotable door 36 functions as a height adjustment member and a cover member inasmuch as door 36 covers connector 32 when door 36 is in position P1 and elevates base 16 above the support surface by a distance $d_1$ equivalent to the thickness $t_1$ of the planar portion 36a when door 36 is in position P2.

Figure 5:
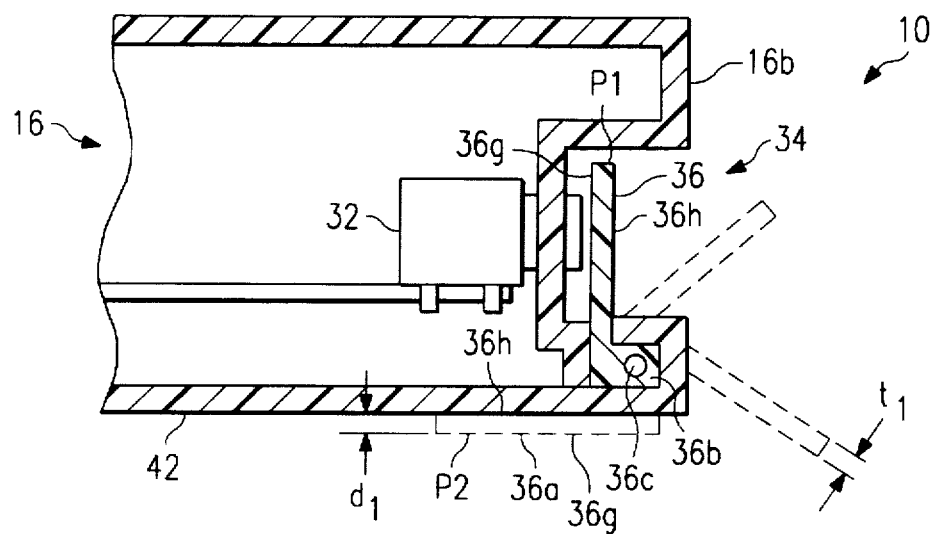
FIG. 5 is an enlarged partial cross-sectional side view still further illustrating the embodiment of FIG. 3.
Figure 6:
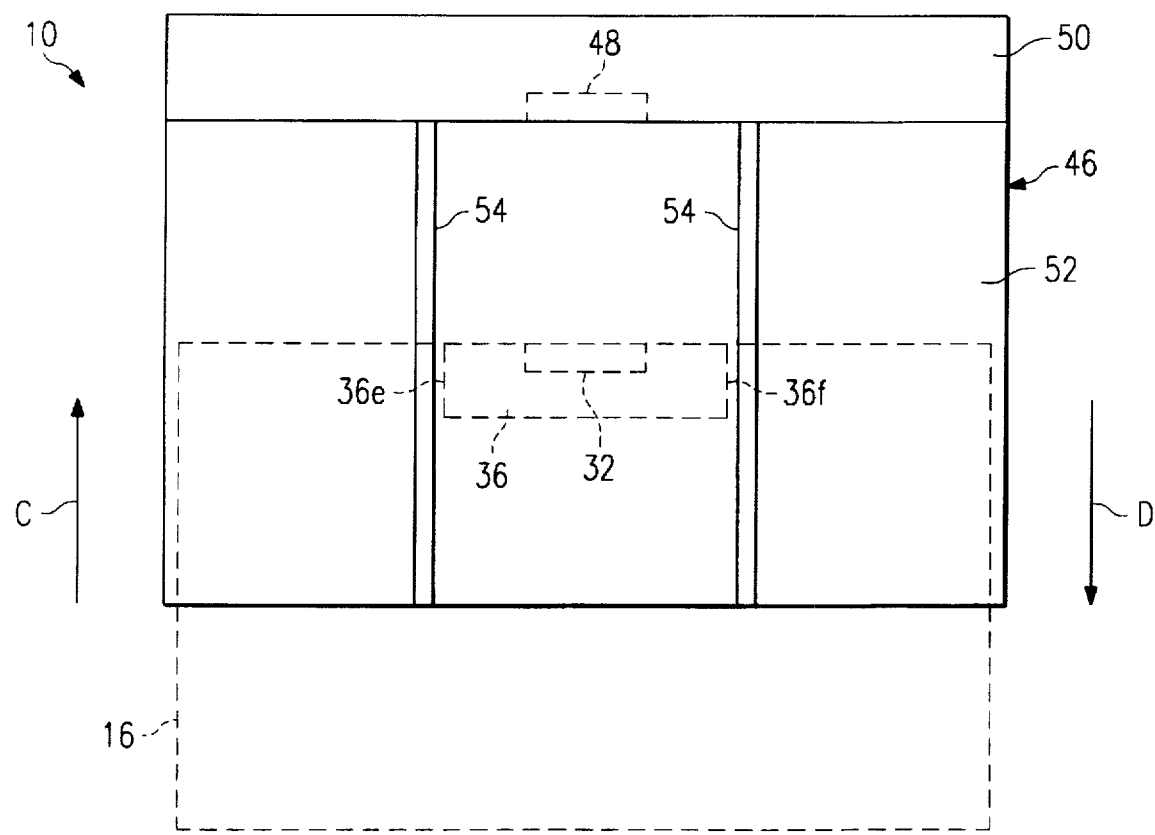
FIG. 6 is a plan view diagrammatically illustrating an embodiment of a docking tray and a portable notebook computer.

A docking tray 46, FIG. 6, may be used to connect computer 10 to a power source, a network, or for recharging power in notebook computer 10. Such connection is provided by means of a male connector 48 housed in a docking terminal 50 of docking tray 46. A support surface 52 of docking tray 46 is integrally formed with docking terminal 50 and includes a pair of parallel, spaced apart guide rails 54 extending from docking terminal 50 and along surface 52. Spacing between guide rails 54 is of sufficient width to engage a pair of opposed edges 36e and 36f, FIGS. 6 and 7, of door 36 when door 36 is pivoted to position P2, FIG. 5, and rest surface 42 of computer 10 is placed on docking tray 46, FIG. 7. Pivoting of door 36 from position P1 to P2, FIG. 5, rotates door 36 through the 270° arc so that planar portion 36a of door 36, which includes a planar surface 36g immediately adjacent connector 32 when door 36 is in position P1, is rotated to position P2 adjacent rest surface 42 of base 16. In position P2, planar surface 36h of door 36, which is opposite planar surface 36g, abuts rest surface 42 of base 16. This positions planar surface 36g, FIG. 7, of door 36 for engagement with support surface 52 of docking tray 46 and also positions edges 36e and 36f of door 36 for engagement between guide rails 54 when base 16 is mounted on docking tray 46. Guide rails 54, FIG. 6, function to horizontally align female connector 32 of base 16 with male connector 48 of docking tray 46. Planar portion 36a, FIG. 8, of door 36 functions to vertically align female connector 32 of base 16 with male connector 48 of docking tray 46.

In operation, door 36, FIG. 5, is in position P1 wherein planar surface 36g of door 36 is immediately adjacent female connector 32 of computer 10. Door 36 is rotated through the 270° arc to position P2 which positions planar surface 36h of door 36 in abutment with rest surface 42 of base 16. Mounting computer 10, FIG. 7, on docking tray 46 places rest surface 42 adjacent support surface 52 of docking tray 46 and positions planar surface 36g of door 36 in sliding engagement with support surface 52. Also, opposed edges 36e and 36f are positioned between guide rails 54 for sliding engagement therewith. Computer 10, FIG. 6, can be slidingly guided toward docking terminal 50 in the direction of an arrow designated C, until male connector 48 of docking tray 46 and female connector 32 of base 16 become electrically and mechanically connected. Removal of computer 10 from docking tray 46 upon completion of the docking operation, requires sliding computer 10 away from docking terminal 50 in the direction of an arrow designated D, so that female connector 32 of base 16 becomes electrically and mechanically disconnected from male connector 48. Further movement of computer 10 away from docking terminal 50, slides opposed edges 36e and 36f between guide rails 54 and slides surface 36g of door 36 along support surface 52, FIGS. 6 and 7. Computer 10 can be lifted from support surface 52 of docking tray 46 and door 36 can be rotated from position P2, FIG. 5, to position P1 so that planar surface 36g is immediately adjacent connector 32.

As it can be seen, the principal advantage of this embodiment is that the various heights of docking connectors can be accommodated by a cover door being pivoted to the underside of a portable computer which places the door between the underside of the computer housing and a support surface of a docking tray. This elevates the computer housing relative to the support surface to an adjusted height for docking and utilizes opposite edges of the cover door in combination with guide rails on the docking tray for maintaining proper lateral alignment of the computer with the docking connector.

The door has a dual purpose in that it covers the connector and provides for height adjustment. The door must be moved away from the connector for docking, and when moved, it becomes a self-contained height adjuster, i.e., the user is forced to move the door for docking, and if the door is not moved, no docking can occur. When the door is moved, height adjustment is automatic.

Since the docking connector is placed on the rear housing surface of the notebook computer behind a cover door, the cover door is required to be moved out of the way before the computer is placed on the docking tray. The notebook is then placed on the docking tray and slid into the engaged position. To solve the often encountered problem of Z (vertical) height alignment of various notebook computers, the cosmetic door that covers the computer connector is now also used as a height adjuster. The door thickness can be varied to raise the computer to the proper height per individual computer. The door can be rotated 270° from the computer connector to the underside of the computer. This positions the door to elevate the notebook computer to the desired docking height. The outside or opposite edges of the door function as guides to accommodate the guide rails on the docking tray. This removes the need to use custom trays for docking.

With regard to the thickness of the door and its effect on height adjustment, there are several considerations. A given series of particular notebook computers will be produced with a predetermined door thickness. Other series of computers can be produced with their own respective door thicknesses. It has been found that if the door thickness exceeds 3 mm, an undesirable angle exists between the male and female connectors. To correct this, a secondary height adjustment device could be added to the base of the computer to maintain the computer substantially level.

Although an illustrative embodiment has been shown and described, a wide range of modifications, change and substitution is contemplated in the foregoing disclosure and in some instances, some features of this embodiment may be employed without a corresponding use of other features. Accordingly, it is appropriate that the appended claims be construed broadly and in a manner consistent with the scope of the embodiment disclosed herein.

What is claimed is:

1. A computer system comprising:

a computer housing having a bottom support surface;

a first docking connector mounted in the housing;

a docking tray including a tray surface;

a second connector mounted on the tray; and a door mounted on the housing for movement between a first position covering the first docking connector and a second position uncovering the connector, the door including a planar portion having opposed planar surfaces, such that when the door is in the second position, a first one of the planar surfaces is engaged with the bottom support surface of the computer housing, and a second one of the planar surfaces is engaged with the tray surface for supporting the computer housing in an elevated position, whereby the first docking connector is height adjusted for engagement with the second docking connector.

2. The system as defined in claim 1 wherein the door is pivotally connected to the housing.

3. The system as defined in claim 2 wherein the door is pivoted to abut an external surface of the housing in the second position.

4. The system as defined in claim 1 wherein the door is pivotally connected to the housing and includes a pivot connection portion.

5. The computer system as defined in claim 1 further comprising the docking tray having guide rails thereon, the door including opposed edges for guided, sliding engagement with the guide rails.

6. A computer system including a docking height adjustment comprising:

a computer housing having a bottom support surface;

a first docking connector mounted in the housing;

a docking tray including a tray surface;

guide members supported on the tray surface;

a second connector mounted on the tray; and a height adjustment and cover member mounted on the housing and movable from a first position wherein the first connector is covered, to a second position wherein the connector is uncovered, the height adjustment and cover member including a planar portion having opposed planar surfaces and opposed edges, such that when the height adjustment and cover member is in the second position, the edges engage the guide members, a first one of the planar surfaces is engaged with the bottom support surface of the computer housing, and a second one of the planar surfaces is engaged with the tray surface for supporting the computer housing in an elevated position, whereby the first docking connector is height adjusted for engagement with the second docking connector.

7. The system as defined in claim 6 wherein the height adjustment and cover member is pivotally connected to the housing.

8. The system as defined in claim 7 wherein the height adjustment and cover member is pivoted to abut the external surface of the housing in the second position.

9. The system as defined in claim 6 wherein the height adjustment and cover member is pivotally connected to the housing and includes a pivot connection portion.

10. A method of providing a computer system docking height adjustment comprising the steps of:

mounting a movable door on a computer housing, the door including a planar portion having opposed edges and opposed planar surfaces and being movable to cover and uncover a first connector;

moving the door to uncover the first connector to a position wherein a first one of the planar surfaces engages an underside of the housing mounting the computer housing on a docking tray including a tray surface having guide members thereon, and having a second connector;

placing the housing on the tray surface so that the opposed edges of the door engage the guide members and a second one of the planar surfaces engages the tray surface, whereby the first connector is height adjusted for engagement with the second connector.

11. The method as defined in claim 10, wherein the step of moving the door includes the step of pivoting the planar portion of the door about a pivot connection between the door and the housing.

12. A computer system comprising:

a computer housing having a bottom support surface;

a docking connector mounted in the housing;

a door mounted on the housing for movement between a first position covering the connector and a second position uncovering the connector, the door including a planar portion having opposed first and second planar surfaces, such that when the door is in the first position, the first planar surface is immediately adjacent the connector and when the door is in the second position, the second planar surface is coplanar to the bottom support surface.

* * * * *

UNITED STATES PATENT AND TRADEMARK OFFICE
CERTIFICATE OF CORRECTION

PATENT NO. : 5,754,397
DATED : May 19, 1998
INVENTOR(S) : Bryan Howell, Peter N. Skillman, Bryan K. Hunter It is certified that error appears in the above-identified patent and that said Letters Patent is hereby corrected as shown below:

Claim 5, line 1, "farther" should read –further–.

Signed and Sealed this

Twenty-fourth Day of August, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO.   : 5,754,397
DATED        : May 19, 1998
INVENTOR(S)  : Howell et al.

Page 1 of 1

It is certified that error appears in the above-identified patent and that said Letters Patent is hereby corrected as shown below:

<u>Title page,</u>
Item [73], Assignee, please delete "Dell Computer Corporation" and insert
-- Dell USA, L.P., Round Rock, Texas --.

Signed and Sealed this

Tenth Day of June, 2003

JAMES E. ROGAN
*Director of the United States Patent and Trademark Office*